(12) United States Patent
Cok

(10) Patent No.: US 7,230,608 B2
(45) Date of Patent: Jun. 12, 2007

(54) OLED DISPLAY AND TOUCH SCREEN

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 516 days.

(21) Appl. No.: 10/830,648

(22) Filed: Apr. 23, 2004

(65) Prior Publication Data

US 2005/0237317 A1  Oct. 27, 2005

(51) Int. Cl.
  *G09G 5/00*  (2006.01)
(52) U.S. Cl. .......................................... 345/173; 345/76
(58) Field of Classification Search ................ 345/156, 345/173, 174, 175, 176, 177, 76, 77, 78, 345/79, 80, 82; 178/18.01–18.09, 19.01–19.05
See application file for complete search history.

(56) References Cited

U.S. PATENT DOCUMENTS 5,196,836 A * 3/1993 Williams ..................... 345/175
6,690,393 B2 * 2/2004 Heron et al. ................ 715/757
6,762,747 B2 * 7/2004 Fujioka et al. .............. 345/157

* cited by examiner

*Primary Examiner*—Richard Hjerpe
*Assistant Examiner*—Jean Lesperance
(74) *Attorney, Agent, or Firm*—Andrew J. Anderson

(57) ABSTRACT

An OLED display and touch screen system, including: a) a substrate; b) an OLED display area including an array of individually addressable OLEDs formed on the substrate; and c) a touch screen including at least one OLED light emitter formed on the substrate and a plurality of light sensors formed on the substrate across the display area from the light emitter, each of the light sensors having an elongated surface area with a first relatively short dimension and a second relatively long dimension and being positioned adjacent to an edge of the display area, with the relatively long dimension positioned substantially perpendicular to the adjacent edge of the display area, and optics located around the display area above the light emitter and the light sensors for directing light emitted from the light emitter across the display area to the surface area of the light sensors. The system is advantageous in that it enables a thin, light, easily manufacturable display having an integrated optical touch screen having reduced weight, size, and cost, a greater reliability and improved sensitivity and resolution.

17 Claims, 3 Drawing Sheets

OLED DISPLAY AND TOUCH SCREEN

FIELD OF THE INVENTION

This invention relates generally to organic light emitting diode (OLED) displays and, more particularly, to an OLED display with a touch screen.

BACKGROUND OF THE INVENTION

Modern electronic devices provide an increasing amount of functionality with a decreasing size. By continually integrating more and more capabilities within electronic devices, costs are reduced and reliability increased. Touch screens are frequently used in combination with conventional soft displays such as cathode ray tubes (CRTs), liquid crystal displays (LCDs), plasma displays and electroluminescent displays. The touch screens are manufactured as separate devices and mechanically mated to the viewing surfaces of the displays.

U.S. 2002/0175900 A1 by Armstrong, published Nov. 28, 2002, describes a touch system for use with an information display system including a frame defining an opening corresponding in size and shape to an information display area of a display. On each side is positioned an array of light emitting devices with a light-transmissive prism positioned along each array of light emitting devices such that light emitted from the light emitting devices is directed across the touch input area. The system also includes light detection devices positioned at each corner of the frame. In a preferred embodiment, the light emitting devices are organic light emitting diodes.

When such a touch screen is used with a flat panel display, the touch screen is simply placed over the flat panel display and the two are held together by a mechanical mounting means such as an enclosure. These prior-art arrangements combining touch screens and OLED displays suffer from a variety of drawbacks. The use of frames increases the parts count, weight, and cost of the device. The separation between the touch screen and display increases thickness. Redundant components found in the display and touch screen further increase cost and decrease performance as compared to more integrated solutions. Moreover, the need for separate cabling for the touch screen increases manufacturing costs.

Copending, commonly assigned U.S. Ser. No. 10/346,987 (filed Jan. 17, 2003) and Ser. No. 10/703,808 (filed Nov. 7, 2003) describe integrated OLED display and touch screen system comprising: a) a substrate; b) an OLED display area including an array of individually addressable OLEDs formed on the substrate; and c) a touch screen including at least one OLED light emitter formed on the substrate and at least one light sensor formed on the substrate across the display area from the light emitter, and optics located around the display area above the light emitter and the light sensor for directing light emitted from the light emitter across the display area to the light sensor. While advantageous, sensors employed in such an arrangement may not provide sufficient sensitivity and resolution to meet needs for some applications. Thus, there remains a desire for a further improved touch screen, flat-panel display system that minimizes device weight, removes redundant materials, decreases cost, eliminates special mechanical mounting designs, increases reliability, minimizes the degradation in image quality, and provides improved sensitivity and resolution.

SUMMARY OF THE INVENTION

In accordance with one embodiment, the invention is directed towards an OLED display and touch screen system, comprising: a) a substrate; b) an OLED display area including an array of individually addressable OLEDs formed on the substrate; and c) a touch screen including at least one OLED light emitter formed on the substrate and a plurality of light sensors formed on the substrate across the display area from the light emitter, each of the light sensors having an elongated surface area with a first relatively short dimension and a second relatively long dimension and being positioned adjacent to an edge of the display area, with the relatively long dimension positioned substantially perpendicular to the adjacent edge of the display area, and optics located around the display area above the light emitter and the light sensors for directing light emitted from the light emitter across the display area to the surface area of the light sensors.

The display according to the present invention is advantageous in that it provides a thin, light, easily manufacturable display having an integrated optical touch screen having reduced weight, size, and cost, a greater reliability and improved sensitivity and resolution.

DETAILED DESCRIPTION OF THE INVENTION

Figure 1:
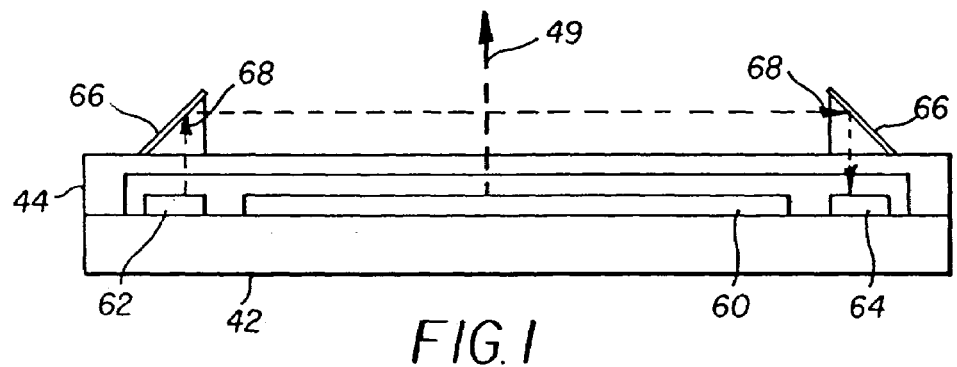
FIG. 1 is a schematic side view showing the basic structure of an integrated OLED display and touch screen according to the present invention.

Referring to FIG. 1, a top-emitting OLED display device with an integrated optical touch screen according to one embodiment of the present invention includes a rectangular substrate 42 with an encapsulating cover 44. Located on the substrate is an OLED display area 60 including electrodes and multiple layers of materials such as hole-injection layers and electron transport layers as is well known in the art (not shown), which make up an array of individually addressable OLEDs formed on the substrate. Light 49 emitted from the display passes through the encapsulating cover 44 or is reflected from the substrate 42 and is emitted through the encapsulating cover 44. At one side of the substrate 42 is an array of infra-red OLED light emitters 62 adjacent to an edge of the display area 60. Infrared OLED light emitters are known and can be made, for example, by doping OLED devices with rare-earth ions such as neodymium or erbium. At the opposite side of the rectangular substrate 42, across the display area 60 from the light emitters 62, is an array of infra-red light sensors 64 adjacent to an opposite edge of the display area 60. The sensors may include filters to improve their frequency response.

Figure 2:
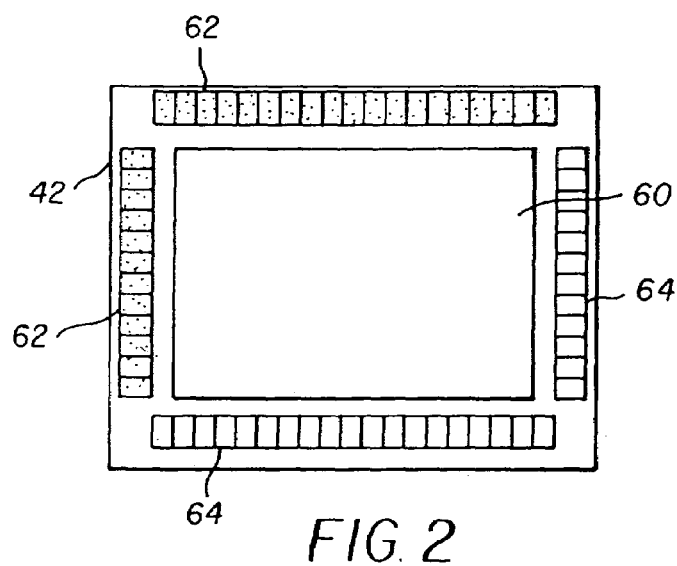
FIG. 2 is a schematic top view of the integrated OLED display and touch screen.

As shown in FIG. 2, a second pair of emitter and sensor arrays are arranged on the other two sides of the rectangular substrate 42 and adjacent to the edges of the display area 60. According to the present invention, both the light emitters 62 and sensors 64 are integrated on the same substrate as the OLED elements in display area 60. Optics, such as mirrors (not shown in FIG. 2) are arranged over the encapsulating cover (not shown in FIG. 2) directly above the emitter and sensor arrays for directing light emitted from the light emitters 62 across the display to the light sensors 64. The mirrors can be constructed using glass or plastic prisms with a reflective side arranged at approximately 45 degrees to the cover. Alternatively, the mirrors can be supported at approximately 45 degree angles with respect to the cover. A touch screen controller (not shown) is connected to the touch screen to operate the emitters 62 and sensors 64.

Figure 3A:
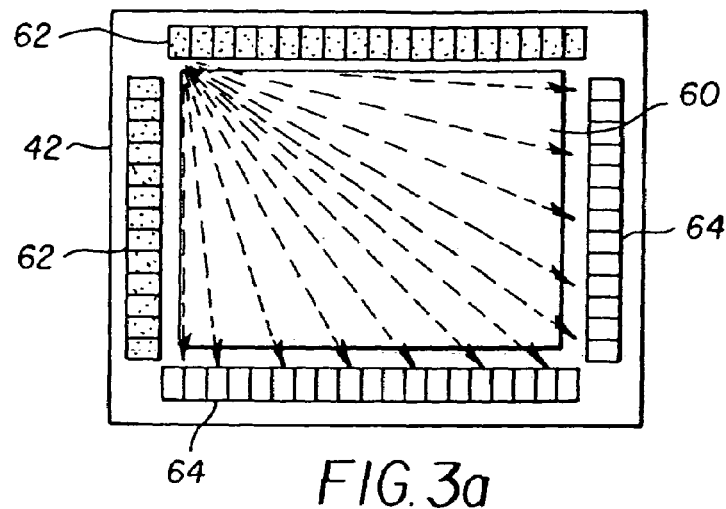
FIGS. 3a and 3b are schematic top views of an integrated OLED display and touch screen showing alternate locations of the emitters and sensors.
Figure 3B:
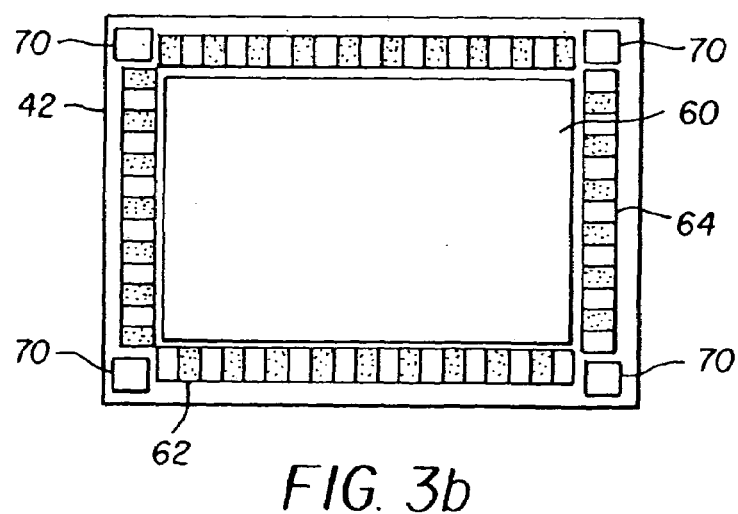

Referring to FIGS. 3a and 3b, a top view of alternative arrangements of the light emitters 62 and sensors 64 are shown. In the arrangement shown in FIG. 3a, the light emitters 62 are located in two arrays adjacent two contiguous edges of the display area 60 and the sensors 64 are located in two arrays adjacent the other two edges of the display area 60. In the arrangement shown in FIG. 3b, the light emitters 62 and sensors 64 are interdigitated in arrays surrounding the display area 60.

The surface areas of the sensors 64 are elongated, and preferably rectangular, in shape, with the relatively longer dimension of the light sensitive area of the sensors being positioned substantially perpendicular to the adjacent edge of the display area 60. Experiments by applicant have determined that the response of such thin-film sensors to radiation available from an OLED emitter is such that the light sensitive surface area of the sensors is preferably larger than 62500 square microns. Preferably, the sensors 64 are thin-film sensors formed at the same time and with the same materials and processes as any active components integrated on the substrate 42 and used to drive the light-emissive pixels in the display area 60. Typical touch screen applications preferably have a resolution of at least 50 elements per inch, more preferably at least 100 elements per inch. Hence, in preferred embodiments, the light sensors are formed with a short side of less than or equal to 500 microns, more preferably of less than or equal to approximately 250 microns. In most preferred embodiments, the sensors in the array have a long side of more than 250 microns. Sensors having an elongated shape provide both the resolution and the response desired for the touch screen. Sensors having a short side adjacent to the display area of approximately 250 microns and a long side of approximately 1000 microns are particularly suitable.

Preferably, though not necessarily, the surface areas of the light emitters 62 are also elongated (e.g., rectangular) in shape, with a high length to width aspect ratio to provide suitable resolution and size. Increased size is helpful in producing a greater amount of radiation, thereby improving the signal-to-noise ratio of the sensors.

In the arrangement shown in FIG. 3b, the OLED display is further augmented by ambient light photo-sensors 70 located on the substrate next to the corners of the display area. Since the emitters and sensors are located adjacent to the edges of the display area, the areas on the substrate diagonal to the corners of the display area at the ends of the arrays of sensor and touch screen emitters are open and may be employed for a photo-sensor and used to detect the ambient level of light. This information may be useful in controlling the light intensity of the display.

In operation, the infra-red OLED light emitters 62 emit light 68 (FIG. 1) in every direction. The light 68 is reflected from the 45-degree mirrors 66 located above the emitters and passes over the surface of the OLED display area 60. After passing over the surface of the OLED display area, the light 68 is reflected by the 45-degree mirrors located above the sensors 64 to the infra-red sensors 64. The sensors 64 detect the light and produce feedback signals that are supplied to the touch screen controller and interpreted in a conventional manner to locate the position of an object that interrupts the light from the emitters 62. Because the touch screen elements are integrated on a common substrate with the display elements, a single power and signal connector may be used for both the touch screen and the display. Elements of the touch screen controller and/or the display controller may be integrated on the substrate.

Because each infrared OLED light emitter 62 emits light in every direction, a single emitter can be used in conjunction with multiple sensors 64 to detect a touch. The emitters and sensors can be energized sequentially or in common to optimize the performance of the touch screen under a wide variety of conditions, including high ambient light, low-power operation, a noisy environment, or high-performance mode. Sequentially energizing the emitters provides multiple signals thereby increasing the signal-to-noise ratio of the result and providing a more detailed map of any touching implement that inhibits the transmission of the infrared light. In yet another mode, the emitters are energized simultaneously and the relative amount of light sensed by the sensors 64 are used to detect a touch. In this arrangement, the emitters 62 can be a single long emitter with a single control signal.

The use of multiple emitters and sensors enables a very robust sensing apparatus. Single-point failures can be overcome and convex shapes can be detected. High-reliability operation is possible by combining signals from various emitters sensed by various sensors. The infrared signal itself may be modulated to overcome background noise or different frequencies of infrared light may be emitted and detected.

Figure 4:
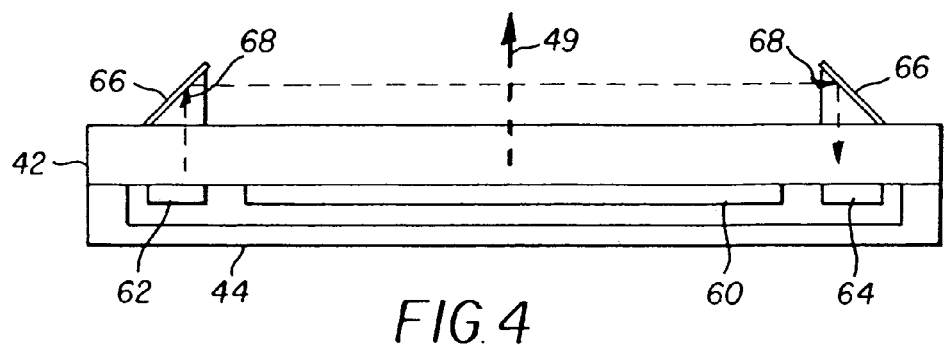
FIG. 4 is a schematic side view of an integrated OLED display and touch screen wherein the OLED display is a bottom emitting display.

Referring to FIG. 4, a bottom-emitting OLED display device with an integrated optical touch screen according to another embodiment of the present invention includes a rectangular substrate 42 with an encapsulating cover 44. Located on the substrate is an OLED display area 60 including electrodes and multiple layers of materials such as hole-injection layers and electron transport layers as is well known in the art (not shown). Light 49 emitted from the display passes directly through the substrate 42 or is reflected from the encapsulating cover 44 and passes through the substrate 42.

Figure 5:
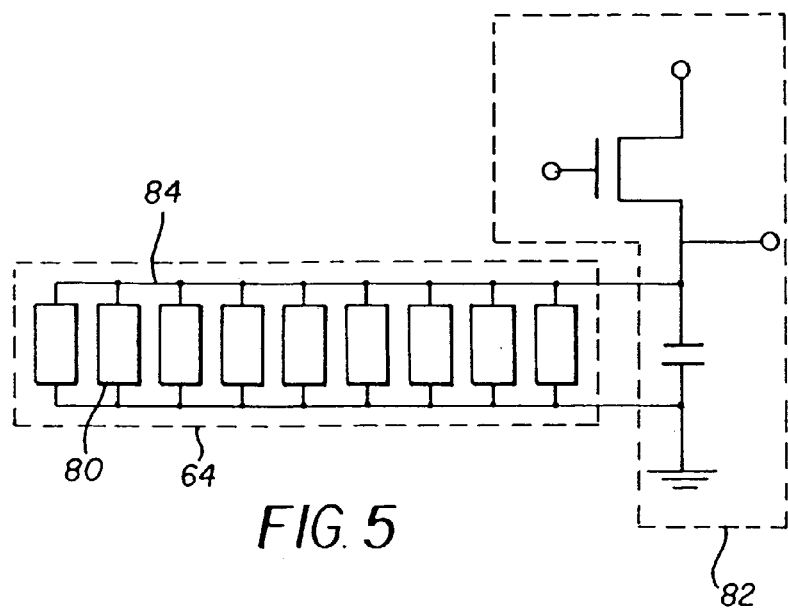
FIG. 5 is a schematic view of an elongated light sensor in accordance with a particular embodiment of the invention.

It is possible to construct each sensor from a single light sensitive element, or from a plurality of individual light sensitive elements (e.g., photo-transistors, photo-diodes, and photo-capacitors) connected in parallel under a common control signal. In such latter embodiment, the individual light sensitive elements of each sensor will be arranged to cumulatively form the elongated surface area of the sensor. Referring to FIG. 5, e.g., a plurality of individual light sensitive elements 80 are combined under a common control signal 84 to form an elongated light sensor 64. Control circuit 82 can be employed to control the light sensor. Such arrangements can be easier and more reliable to construct given that the conductivity of the sensors and emitters may be significantly lower than the conductivity of the control and power lines feeding them. Similarly, elongated OLED light emitters may be formed from a plurality of individual diodes connected in parallel under a common control.

Because the present invention does not require a separate frame or substrate for the touch screen, it reduces the weight, size (thickness), and cost of a combined touch screen and OLED display device.

The invention has been described in detail with particular reference to certain preferred embodiments thereof, but it will be understood that variations and modifications can be effected within the spirit and scope of the invention.

PARTS LIST 42 substrate
44 encapsulating cover
49 emitted light
60 OLED display area
62 light emitter
64 light sensor
66 mirror
68 light
70 photo-sensor
80 light sensitive element
82 control circuit
84 control light

What is claimed is:

1. An OLED display and touch screen system, comprising:
   a) a substrate;
   b) an OLED display area including an array of individually addressable OLEDs formed on the substrate; and
   c) a touch screen including at least one OLED light emitter formed on the substrate and a plurality of light sensors formed on the substrate across the display area from the light emitter, each of the light sensors having an elongated surface area with a first relatively short dimension and a second relatively long dimension and being positioned adjacent to an edge of the display area, with the relatively long dimension positioned substantially perpendicular to the adjacent edge of the display area, and optics located around the display area above the light emitter and the light sensors for directing light emitted from the light emitter across the display area to the surface area of the light sensors.

2. The OLED display and touch screen claimed in claim 1, comprising a linear array of individually addressable OLED light emitters positioned adjacent an edge of the display area, and wherein the light sensors comprise a linear array of light sensors positioned adjacent an edge of the display area.

3. The OLED display and touch screen claimed in claim 2, wherein the OLEDs of the OLED light emitters and the light sensors are interspersed in a plurality of linear arrays.

4. The OLED display and touch screen claimed in claim 2, wherein each OLED light emitter has a surface area with two short sides and two long sides formed on the substrate with one short side adjacent to the display area.

5. The OLED display and touch screen claimed in claim 4, wherein the OLED light emitters are formed with a short side of less than or equal to 500 microns and a long side of more than 500 microns.

6. The OLED display and touch screen claimed in claim 1, wherein the OLED light emitter is a linear OLED positioned adjacent an edge of the display area and the light sensors comprise a linear array of light detecting elements positioned adjacent an edge of the display area.

7. The OLED display and touch screen claimed in claim 1, wherein the light sensors are formed with more than or equal to 100 sensors per inch along the adjacent edge of the display area.

8. The OLED display and touch screen claimed in claim 1, wherein the light sensors comprise rectangular elements having two short sides and two long sides formed on the substrate with one short side adjacent to the display area.

9. The OLED display and touch screen claimed in claim 8, wherein the light sensors are formed with a short side of less than or equal to 500 microns and a long side of more than 500 microns.

10. The OLED display and touch screen claimed in claim 1, further comprising one or more photo-sensors for detecting ambient light located on the substrate next to one or more corners of the display area.

11. The OLED display and touch screen claimed in claim 1, wherein each light sensor is made up of a plurality of individual light sensitive elements connected in parallel with a common control.

12. The OLED display and touch screen claimed in claim 1, wherein each OLED light emitter is made up of a plurality of diodes connected in parallel with a common control.

13. The OLED display and touch screen claimed in claim 1, wherein the light sensors are thin-film sensors.

14. The OLED display and touch screen claimed in claim 1, wherein the light sensors comprise silicon photo-sensors.

15. The OLED display and touch screen claimed in claim 1, wherein the OLED display is a bottom emitting display.

16. The OLED display and touch screen claimed in claim 1, wherein the OLED display is a top emitting display.

17. The OLED display and touch screen claimed in claim 1, wherein the OLED light emitter emits infrared light.

* * * * *